3,170,927
NEW TROPEINE DERIVATIVES HAVING AN
AXONAL BLOCKING EFFECT
Károly Nádor, 4/a Abel Jeno Utca; Lajos György,
14 Taltos Utca; and Margit Doda, 2/c Karpat Utca, all
of Budapest, Hungary
No Drawing. Filed Oct. 3, 1962, Ser. No. 229,263
6 Claims. (Cl. 260—292)

This invention relates to new tropine derivatives, and has for its object the preparation of them, the new compounds having axonal blocking effect.

It is known that compounds having strong ganglionic blocking effect can be prepared by reacting tropeines (3-α-ol or 3-β-ol esters of tropene), or the substituted derivatives of tropeines, or the tropine itself with aralkyl halogenides substituted in para position with an alkyl, aryl or halogen group. A part of these compounds shows, besides the antiganglionic effect, anticholinergic, and antiacetylcholinic effects as well.

On the other hand, it has been surprisingly found that if an aralkyl group substituted in para-position with a cyclo aliphatic radical is used as the quaternizing group, unexpectedly an axonal blocking effect appears.

These new quaternary tropeines of axonal blocking effect are characterized by the general Formula I

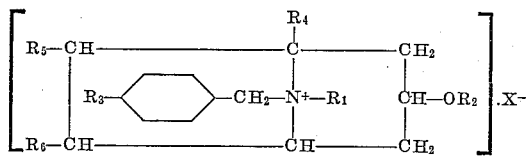

where $R_1$ is a member selected from the group consisting of alkyl and aralkyl radicals, $R_2$ is a member selected from the group consisting of hydrogen and acyl radicals, $R_3$ is a member selected from the group consisting of cycloalkyl and alkyl substituted cycloalkyl radicals, $R_4$ is a member selected from the group consisting of hydrogen and alkyl radicals, $R_5$ and $R_6$ are members selected from the group consitsing of hydrogen, alkoxy, acyloxy, hydroxyl groups and an epoxy group, X is an anion.

The $OR_2$ group may be in the syn($\alpha$) or anti($\beta$) position in relation to the nitrogen atom; if $R_2$ is an acyl group, it may be preferably an acetyl, benzoyl, alkoxy benzoyl, amygdalyl, mandelyl or tropeyl group; the cyclo-aliphatic group $R_3$ may be preferably a cyclohexyl, p-methyl-cyclohexyl or cyclopentyl group; the anion X may be preferably a halogen atom or a methane sulphonyl radical.

The new quaternary tropeines of Formula I can be prepared by reacting a tropeine of the Formula II

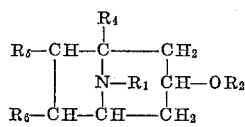

where $R_1$, $R_2$, $R_4$, $R_5$, $R_6$ have the same meaning as above, with compounds of the Formula III

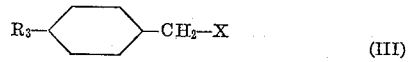

where $R_3$ and X have the same meaning as above.

The reaction can be carried out in a non-polar solvent, advantageously in acetone, methyl-ethyl-keton or acetonitrile, at room temperature or at the boiling point of the reaction mixture or at intermediate temperatures. It is advantageous to use the aralkyl derivative in a small excess. The yield can be increased by adding a non-polar solvent, e.g. ether, which can be mixed with the employed polar solvent.

The compounds of Formula I, in which $R_2$ stands for a hydrogen atom, may be converted to acylated compound of Formula I (in which $R_2$ represents an acyl group) by acylating the 3-hydroxyl group by methods known in the art.

The acylation is carried out by fusion at a temperature ranging from 80 to 150° C., depending on the chemical character of the components taking part in the reaction, whereafter the acid halogenid is boiled with ether and then it is purified. If the acylation is carried out with an oxy-acid, it is suitable to temporarily protect its hydroxyl group by acylation during the preparation of the acid halogenid and during the quaternization. Thereafter the protecting group can be removed by mild hydrolysis.

An axonal blocking effect similar to that shown by the compounds prepared according to the invention has been found till now merely in case of two compounds which have a structure quite different from that of the compounds having a tropane skeleton; these compounds are the dimethyl - ethyl - (o - chlorobenzyl) - ammonium - p - toluene sulfonate and the 2-(octahydro-1-azocinyl)-ethylguanidine.

The compounds prepared according to the invention are hitherto not known in the chemical literature, and constitute a fully new type in this pharmacological group. Furthermore, they have considerable advantages with respect to the above-mentioned two compounds: they are more active, their hypotensive effect is very durable, they do not show a notable antiganglionic effect, and their antiactylcholinic effect is very slight or fully absent. Their further considerable therapeutical advantage consist in the fact that the increase in the blood pressure preceding the decrease of the blood pressure is very small or transitional, and indeed in some cases it is fully absent; moreover, they are easily absorbed from the gastro-intestinal tract. Besides these advantages their outstanding and unexpected basic effect is especially striking if they are compared with other known compounds having to a certain extent similar tropane skeleton.

In the following comparative table the degree of the antiganglionic effect is compared with that of the tetraethyl ammonium bromide, the effect of the latter compound being considered as 1, while the degree of the antiacetylcholinic effect is compared with that of the atropine, the effect of the latter compound being considered as 1.

| R' | R₁ | R₂ | Reference | Axonal paralyzing effect | Antiganglionic effect | Antiacetyl cholinic effect |
|---|---|---|---|---|---|---|
| —Br | —CH₃ | —C(O)—CH(OH)—C₆H₁₁ | DBP. 1,062.704 | No | 19.0 | 0.15 |
| —C₂H₅ | —CH₃ | —C(O)—CH(CH₂OH)—C₆H₁₁ | Hung. Pat. 149.379 | No | 9.9 | 0.37 |
| —C₂H₅ | —CH₃ | —C(O)—C₆H₁₁ | Hung. Pat. 149.379 | No | 13.3 | 0.002 |
| —C₆H₁₁ | —CH₃ | —C(O)—C₆H₁₁ | Pharmazie 10, 485 (1955) | No | Very strong antiganglionic effect.[1] | 0.001 |
| —C₆H₁₁ (H) | —CH₃ | —C(O)—CH(CH₂OH)—C₆H₁₁ | DBP. 1,062.704, USP. 2,833.775 | No | 26.0 | 0.2 |
| —C₆H₁₁ (H) | —CH₃ | —C(O)—C₆H₁₁ | Present invention, Example 6 | Very strong | Antiganglionic effect.[2] | No. |
| —C₆H₁₁ (H) | —CH₃—CH₃ | —C(O)—C₆H₁₁ | Present invention, Example 36 | Strong | 0.43 | No. |
| —C₆H₁₁ (H) | —C₂H₅ | —C(O)—C₆H₁₁ | Present invention, Example 24 | Very strong | 1.2 | No. |
| —C₅H₉ (H) | —CH₃ | —C(O)—C₆H₁₁ | Present invention, Example 34 | do | 3.2 | No. |
| —C₆H₁₁ (H) | —CH₃ | —C(O)—C₆H₁₀—Cl | Present invention, Example 15 | Strong | 0.6 | No. |
| —C₆H₁₁ (H) | —CH₃ | —C(O)—CH₂—C₆H₁₁ | Present invention, Example 22 | do | 0.3 | 0.001 |

[1] The anti-ganglionic effect of these compounds is 2.5 times stronger than that of the nicotine.
[2] The compound has a slight anti-ganglionic effect, but the duration of this effect is 300–500 times shorter than that of the following blood-pressure lowering effect.

The process according to the invention is further illustrated by the following examples.

Example 1

2.8 g. of tropine (tropane-3α-ol) are dissolved in 20 ml. of acetone, and 5.1 g. of 4-cyclohexyl-benzyl bromide dissolved in 12 ml. of acetone are added. After boiling for 3 hours, the separated quaternary salt is filtered and washed with acetone, whereby 7.7 g. (98.6%) of N-(4-cyclohexyl-benzyl)-tropinium bromide are obtained. Recrystallized from alcohol, it melts at 253° C. with decomposition.

Example 2

7.3 g. of O-acetyl-tropine are dissolved in 50 ml. of acetone and warmed on a water bath with 4-cyclohexyl-benzyl bromide dissolved in 30 ml. of acetone. After separation 16.6 g. of N-(4-cyclohexyl-benzyl)-3α-acetyl-tropinium bromide are obtained.

After recrystallizing from absolute alcohol it melts at 250–255° C. with decomposition.

The same compound can be obtained if the N-(4-cyclohexyl-benzyl)-tropinium bromide prepared with the process described in Example 1 is warmed for 5 hours over at water-bath temperature with an excess amount of acetyl chloride, and after distilling off the acetyl chloride, the obtained crystal pulp is several times boiled with dry ether and recrystallized in a solvent for removing the excess of acetyl chloride.

Example 3

9 g. of O-trimethyl-acetyl tropine prepared by acylating tropine hydrochloride with trimethyl-acetyl chloride are dissolved in 50 ml. of acetone and quaternized for 3 hours with 10.2 g. of 4-cyclohexyl-benzyl bromide at water-bath temperature. The quaternary salt separates out with a yield of 97.9% and is recrystallized from a mixture of alcohol and ether. The obtained N-(4-cyclohexyl-benzyl)-3α-trimethyl-acetyl-tropinium bromide melts at 256° C. with decomposition.

Example 4

9.66 g. of 3α-lauryl tropine prepared by acylating tropine hydrochloride are dissolved in 30 ml. of acetone and heated on water bath for 3 hours with 7.6 g. of 4-cyclohexyl-benzyl bromide diluted with acetone. After isolation 16.5 g. (=95.9%) of crude N-(4-cyclohexyl-benzyl)-3α-lauryl-tropinium bromide are obtained which, after recrystallization from alcohol and drying, melts at 220° C. with decomposition.

Example 5

10.45 g. of tropine-cyclopropane carboxylic acid ester (boiling point: 104–106° C. at a pressure of 0.8 mm. Hg mm.; refractive index at 20° C.: 1.4935) are diluted with 30 ml. of acetone, and 12.8 g. of 4-cyclohexyl-benzyl bromide dissolved in 15 ml. of acetone are added. After warming for 5 hours, the separated quaternary salt is filtered and purified by recrystallizing several times from acetone. The N-(4-cyclohexyl-benzyl)-3α-cyclopropane-carboxy-tropinium bromide melting at 228–230° C. is obtained with a yield of 96.1%.

Example 6

7.35 g. benzoyl tropine carefully freed from water are dissolved in 50 ml. of acetone, and 7.7 g. of 4-cyclohexyl-benzyl bromide dissolved in 15 ml. of acetone are added. When heating on a water-bath, after 2–3 minutes the quaternary salt begins to separate out, and after an hour the separation of the salt is complete. Thus 14 g. of N-(4-cyclohexyl-benzyl)-3α-benzoyl-tropinium bromide are obtained with a yield of 94%, which, after a recrystallization from a mixture of n-propanol and ether, melts at 216° C. with decomposition.

The same compound can be obtained with similarly good yield (92%) if methyl-ethyl-ketone is used as solvent for the quaternization.

Example 7

7.4 g. of 3-β-benzoyl-tropine are dissolved in 50 ml. of acetone and warmed on a water-bath for 3 hours with 7.6 g. of 4-cyclohexyl-benzyl bromide dissolved in 25 ml. of acetone. After filtering, washing with acetone and drying at 60° C. 14.7 g. (98.6%) of N-(4-cyclohexyl-benzyl)-3β-benzoyl-tropinium bromide are obtained which, after recrystallizing several times from a mixture of alcohol and ether, melts at 240–248° C. with decomposition.

Example 8

7.53 g. of 3α-hexahydro-benzoyl tropine dissolved in 20 ml. of acetone are quaternized on a water bath with 7.7 g. of 4-cyclohexyl-benzyl bromide and the quaternary salt obtained with a yield of 97.2% is isolated and purified by recrystallizing from a mixture of alcohol and ether. The obtained N-(4-cyclohexyl-benzyl)-3α-(hexahydro-benzoyl)-tropinium bromide melts at 249° C. with decomposition.

Example 9

7.77 g. of 3α-(o-toluyl)-tropine prepared by melting tropine hydrochloride at 120–130° C. with o-toluic acid hydrochloride are quaternized in acetone with 7.6 g. of 4-cyclohexyl-benzyl bromide for 3 hours on a water bath. After isolation and drying the quaternary salt separated out with a yield of 72.9% melts at 215–216° C. with decomposition. This melting point does not rise even after recrystallization from alcohol.

Example 10

N - (4 - cyclohexyl-benzyl) - 3α - (m-toluyl) - tropinium bromide is prepared in a way similar to that described in Example 9, with a yield of 88.2%. The product melts at 221–222° C.

Example 11

The p-isomer of the compound prepared in compliance with the process described in Examples 9 and 10 that is the N - (4 - cyclohexyl - benzyl) - 3α - (p - toluyl)-tropinium bromide is prepared by quaternizing the p-toluyl-tropine melting at 77° C. with the 4-cyclohexyl-benzyl bromide. After recrystallizing from a mixture of methanol and ether, the compound melts at 238–240° C. with decomposition but the signs of decomposition begin to appear at 230° C.

Example 12

9.4 g. of crystalline 3α-(m-trifluormethyl-benzoyl)-tropine obtained by acylating at 130° C. tropine hydrochloride with m-trifluoromethyl-benzoyl-chloride are dissolved in 30 ml. of acetone, and after diluting with 7.6 g. of 4-cyclohexyl-benzyl bromide dissolved in 35 ml. of acetone it is boiled for 3 hours at the boiling temperature. The N - (4 - cyclohexyl - benzyl) - 3α - (m - trifluoromethyl-benzoyl)-tropinium bromide separates with a yield of 85%.

After recrystallizing from mthanol it melts at 221° C.

Example 13

8.4 g. of o-chloro-benzoyl-tropine (boiling point: 142° at 0.25 Hg mm.; refractive index at 20° C.: 1.5538) dissolved in 20 ml. of acetone are quaternized by heating for 3 hours with 7.6 g. of 4-cyclohexyl-benzyl bromide dissolved in 20 ml. of acetone. The N-(4-cyclohexyl-benzyl)-3α-(o-chlorobenzoyl)-tropinium bromide is obtained with a yield of 92.3%. After recrystallizing from absolute alcohol it melts at 218° C. with decomposition.

Example 14

The N - (4 - cyclohexyl-benzyl - 3α - (m - chlorobenzoyl)-tropinium bromide prepared in a way similar to that described in Example 13 is obtained with a yield of 82%.

After recrystallizing several times it melts in the temperature internal ranging from 230 to 245° C. with decomposition.

Example 15

The p-chloro-benzoyl analogue of the compound described in Example 14 is prepared by the process described in Example 13. The product thus obtained melts at 222° C. with a slight degree of decomposition.

Example 16

8.19 g. of (4-ethyl-benzoyl)-tropine (melting point: 56° C.) diluted with 25 ml. of acetone are warmed for 3 hours at water-bath temperature with 7.6 of 4-cyclohexyl-benzyl bromide diluted with 25 ml. of alcohol. The quaternary compound begins to separate after some minutes of warming. Yield: 15.5 g.=98.2%.

After recrystallizing 3 times from a mixture of alcohol and ether, the compound melts at 225–233° C. with decomposition. On the basis of the data of analysis as well as of the starting materials, the compound is identical with the expected N-(4-cyclohexyl-benzyl)-3α-(4-ethyl-benzoyl)-tropinium bromide.

Example 17

The N - (4 - cyclohexyl - benzyl) - 3α - (3,5 - dimethyl-benzoyl)-tropinium bromide is prepared by dissolving 9 g. of 3α-(3,5-dimethyl-benzoyl)-tropine (melting point: 80–82° C.) in 5-fold quantity of acetone, and thereafter it is warmed with 7.6 g. of 4-cyclohexyl-benzyl bromide. The reaction takes place within some minutes.

The fully solidified reaction product is stirred up with acetone, then filtered, and the quaternary compound separated with a yield of 76% is dried at 60° C. The melting point amounts to 222° C. which does not rise even after recrystallization from a 5:1 mixture of alcohol and ether.

Example 18

9.3 g. of o-phenoxy-benzoyl-tropine are dissolved in 3-fold quantity of acetone and quaternized with 6.4 g. of 4-cyclohexyl-benzyl bromide in the same way as described in the previous examples. The compound can be prepared with a yield of 95%, and it shows at once the final melting point of 207° C., which does not rise even after further recrystallizations from alcohol. The obtained compound is N - (4 - cyclohexyl - benzyl) - 3α - (o-phenoxy-benzoyl)-tropinium bromide as shown by the elementary analysis and by the reaction components.

Example 19

9.03 g. of 3α-(4-tert.-butyl-benzoyl)-tropine (melting point: 81° C.) are dissolved in 25 ml. of actone and 7.6 g. of 4-cyclohexyl-benzyl bromide dissolved in 25 ml. of acetone are added. The reaction starts without delay and takes place within a short time. The crude yield amounts to 15.7 g.=94.5%. The thus-obtained N-(4-cyclohexyl - benzyl) - 3α - (4 - tert. - butyl - benzoyl)-tropinium bromide is recrystallized from 6-fold quantity of absolute alcohol, and the separation is promoted by addition of ether. Thereby 11.35 g. of a pure compound melting at 238–243° C. are obtained.

Example 20

For preparing the N-(4-cyclohexyl-benzyl)-3α-(3,4,5-trimethoxy-benzoyl)-tropinium bromide, 10.5 g. of 3α-(3,4,5-trimethoxy-benzoyl)-tropine are dissolved in 25 ml. of acetone and it is reacted with the acetonous solution of 7.6 g. of 4-cyclohexyl-benzyl bromide at water-bath temperature. After short warming the reaction takes place but, for completing the reaction, the mixture is warmed for some further hours.

After isolation and drying, the desired compound is obtained in a high grade of purity, with a yield of 92.4%. After recrystallizing from 8-fold quantity of absolute alcohol, the compound melts at 208° C.

Example 21

8.85 g. of 3α-(1-naphthoyl)-tropine (M.P.: 63–65° C.) dissolved in 25 ml. of acetone are warmed on water-bath with 7.6 g. of 4-cyclohexyl-benzyl bromide dissolved in 25 ml. of acetone. After warming for 3 hours, the separated crude compound (15.7 g.) is isolated, then recrystallized several times from a mixture of alcohol and ether. The obtained N-(4-cyclohexyl-benzyl)-3α-(1-naphthoyl)-tropinium bromide melts at 225–233° C. with decomposition.

Example 22

7.71 g. of 3α-phenyl-acetyl-tropine are dissolved in 20 ml. of acetone, and 7.72 g. of 4-cyclohexyl-benzyl bromide are added to the lukewarm solution. The mixture is warmed for 3 hours on water bath. After cooling the separated quaternary compound is filtered, washed with a large amount of acetone, then dried at 60° C. M.P.: 209° C. which does not rise even after recrystallization from a 1.5:1 mixture of alcohol and ether. The obtained N-(4-cyclohexyl-benzyl) - 3α - phenyl-acetyl-tropinium bromide can be easily dissolved in water.

Example 23

8 g. of 3α-cyclohexyl-acetyl-tropine having a boiling point of 119–120° C. at 0.08 Hg mm. and prepared from hexahydro-phenyl-acetic acid with thionyl chloride and then with tropine hydrochloride are dissolved in 50 ml. of acetone and warmed on water-bath temperature for three hours with 7.6 g. of 4-cyclohexyl-benzyl bromide dissolved in 25 ml. of acetone. After cooling, the obtained N-(4-cyclohexyl - benzyl) - 3α - (cyclohexyl-acetyl)-tropinium bromide is recrystallized two times from a mixture of alcohol and ether. The obtained pure product melts at 225° C. with decomposition.

Example 24

7.8 g. of N-ethyl-3α-benzoyl-nor-tropine are dissolved in 50 ml. of acetone, and 7.6 g. of 4-cyclohexyl-benzyl-bromide dissolved in 25 ml. of acetone are added to the lukewarm solution. Under the influence of warming, the quaternary salt begins to separate out within some minutes.

After warming for three hours, the separated out compound is filtered, washed with acetone, and then dried at 60° C. The yield amounts to 14.5 g.=94.1%. Melting point: 202–203° C. with decomposition. After recrystallization from alcohol, the obtained $N_a$-ethyl-$N_b$-(4-cyclohexyl-benzyl)-3α-benzoyl-nor-tropinium bromide melts at 203° C. with decomposition.

Example 25

6.88 g. of N-ethyl-3α-cyclohexanoyl-nor-tropine are dissolved in 40 ml. of acetone, and 6.6 g. of 4-cyclohexyl-benzyl bromide dissolved in 25 ml. of acetone are added to the solution. After warming on a water bath for 5 hours, the separated-out white precipitate is filtered, washed with a small amount of cold alcohol, then dried at 60° C. Yield: 11.95%. After recrystallization two times from a 1:2 mixture of alcohol and ether, the obtained $N_a$-ethyl-$N_b$-(4-cyclohexyl-benzyl) - 3α - cyclohexanoyl-nor-tropinium bromide melts at 173° C.

Example 26

8.7 g. of atropine base are dissolved in 70 ml. of acetone with mild warming and 7.6 g. of 4-cyclohexyl-benzyl bromide dissolved in a small amount of acetone are added.

Under the influence of warming, after some minutes, the product of the reaction begins to separate. After warming for an hour the precipitate is filtered and dried at 60° C. Yield: 97.2%. After recrystallizing from alcohol or a 3:2 mixture of alcohol and ether, N-(4-cyclohexyl-benzyl)-atropinium bromide melting at 133° C. is obtained.

Example 27

To 8.3 g. of homatropine base dissolved in 80 ml. of acetone 7.7 g. of 4-(cyclohexyl)-benzyl bromide dissolved in 20 ml. of acetone are added, and after warming for 3 hours the separated quaternary salt is filtered and worked up in the usual way. Yield: 12.4 g. (74.8%). After recrystallizing from a mixture of alcohol and ether, the obtained N - (4 - cyclohexyl-benzyl)-3α-(+)-mandelyl-tropinium bromide melts at 207° C.

Example 28

10.5 g. of tropine benzylic acid ester (melting point: 148° C.) dissolved in 50 ml. of methyl-ethyl-ketone are boiled for three hours with 7.6 g. of 4-cyclohexyl-benzyl bromide dissolved in 30 ml. of acetone. The quaternary compound separates within the first minutes of warming. Yield: 17.7 g. (97.7%). The obtained N-(4-cyclohexyl-benzyl)-3α-benzylyl-tropinium bromide melts at 218° C. with decomposition. Its melting point does not rise even after recrystallizing from alcohol.

Example 29

For preparing the $N_a$-ethyl-$N_b$-(4-cyclohexyl-benzyl)-3α-benzylyl-nor-tropinium bromide, 3.6 g. of tertiary tropeine are dissolved in 10 fold quantity of acetone and warmed on a water bath for 4 hours with 2.6 g. of 4-cyclohexyl-benzyl bromide dissolved in 10 ml. of acetone. The quaternary salt separated out with a yield of 71.2% is filtered and dried. Its melting point amounts to 195° C. with decomposition and does not rise even after further recrystallizations.

Example 30

For preparing the N-(4-cyclohexyl-benzyl)-3α-(phenyl-cyclohexyl-acetyl)-tropinium bromide, 10.2 g. of 3α-(phenyl-cyclohexyl-acetyl)-tropine dissolved in 50 ml. of acetone are warmed for 2 hours on a water bath with 7.7 g. of 4-cyclohexyl-benzyl bromide dissolved in 25 ml. of acetone. The separated out white precipitate is filtered, and after washing with acetone it is dried. Yield: 15.4 g. After several recrystallizations the compound melts at 241° C. with decomposition.

Example 31

8.2 g. of N-isopropyl-3α-benzoyl-nor-tropine (melting point: 88° C. from petroleum ether) are prepared in the usual way, and after dissolving in 30 ml. of acetonitril distilled from 30 ml. of phosphorus pentoxide warmed at 80° C. in a bomb tube for 5 hours with 6.7 g. of 4-cyclohexyl-benzyl bromide dissolved in 10 ml. of acetone. The precipitated-out substance is filtered, washed with a 1:1 mixture of acetone ether and dried.

Yield: 7.5 g. (61.2%). The product is a crude quaternary salt melting at 183° C. with decomposition. After recrystallizing several times from a mixture of alcohol and ether, $N_a$-isopropyl - $N_b$ - (4-cyclohexyl-benzyl)-3α-benzoyl-nor-tropinium bromide melting at a temperature of about 185° C. is obtained.

Example 32

For preparing the $N_a$-ethyl-$N_b$-(4-cyclohexyl-benzyl)-3α-(p-toluyl)-nor-tropinium bromide, 9.2 g. of N-ethyl-3α-(p-toluyl)-nor-tropine base (boiling point: 138–140° C. at 0.08 Hg mm.) dissolved in 50 ml. of acetone are quaternized with 7.6 g. of 4-cyclohexyl-benzyl bromide and worked up in the usual way. Crude yield: 14.6 g. After recrystallizing three times from a mixture of alcohol and ether, the compound melts at 207° C. with decomposition.

Example 33

8.3 g. of 3α-benzoyl-tropine are dissolved in 60 ml. of acetone and warmed on a water bath for 8 hours with the acetonous solution of 8.3 g. of 4-cyclohexylbenzyl chloride boiling at 142–143° C. at 0.5 Hg mm. and obtained by chloromethylation of phenylcyclohexane. After 3 hours of warming, the quaternary salt begins to separate out. The crude quaternary salt is filtered, washed with acetone and dried at 60° C. Yield: 14 g. (77.7%). Melting point: 198–200° C. After recrystallization from a mixture of alcohol and ether, the obtained N-(4-cyclohexyl-benzyl)-3α-benzoyl-tropinium chloride has the same melting point as the crude salt.

Example 34

To 7.35 g. of 3α-benzoyl-tropine dissolved in 46 ml. of acetone 7.2 g. of 4-cyclopentyl-benzyl bromide obtained by bromomethylation of phenyl-cyclopentane are added. (Boiling point of the 4-cyclopentyl-benzyl bromide: 100° C. at 0.06 Hg mm.; refractive index at 20° C.: 1.5742). The reaction mixture is diluted with further 25 ml. of acetone and warmed for 3 hours. The crude N-4-cyclopentyl-benzyl-3α-benzoyl-tropinium bromide isolated with a yield of 95.1% melts at 223–224° C.

The melting point does not rise even after recrystallizing from a mixture of alcohol and ether.

Example 35

The acetonous solution of 7.35 g. of benzoyl tropine is quaternized in the usual way with the acetonous solution of 8.1 g. of 4-cycloheptyl-benzyl bromide (B.P.: 110–112° C. at 0.16 Hg mm.) obtained by bromomethylating cycloheptyl benzene prepared by reacting cycloheptane with benzene. The separated-out N-(4-cycloheptyl-benzyl)-3α-benzoyl-tropine is isolated with a yield of 94%. After recrystallizing from isopropyl alcohol, the obtained substance melts at 201–203° C.

Example 36

7.4 g. of benzoyl-tropine dissolved in 50 ml. acetone are warmed on a water bath for 4 hours with 8.1 g. of 1-methyl - 1 - (4 - bromomethyl-phenyl)-cyclohexane. The quaternary salt obtained with a yield of 84.4% is N-[4-(1′-methyl-cyclohexyl)-benzyl]-3α-benzoyl-tropinium bromide. Melting point: 211° C. The melting point does not rise even after further recrystallizations.

Example 37

8 g. of 3α,6β-diacetoxy-tropane dissolved in 50 ml. of acetone are warmed on a water bath for 4 hours with 8.5 g. of 4-cyclohexyl-benzyl bromide. Yield: 13.6 g. After recrystallizing from a mixture of alcohol and ether, the obtained N-4-cyclohexyl-benzyl-3α,6β-diacetoxy-tropinium bromide melts at 186° C.

Example 38

1.5 g. of 6β-hydroxy-3α-acetyl-tropine are dissolved in 9 ml. of acetone and warmed for 3 hours at water-bath temperature with 2 g. of 4-cyclohexyl-benzyl bromide dissolved in 4 ml. of acetone. The quaternary salt separated out with the theoretical yield is filtered and recrystallized from 5-fold quantity of alcohol, whereby the N-(4-cyclohexyl-benzyl)-6β-hydroxy-3α-acetyl-tropinium bromide is obtained with a melting point of 227° C.

Example 39

8.25 g. of 3α-benzoyl-6-methoxy-tropine are dissolved in 35 ml. of acetone and warmed for 3 hours at water-bath temperature with 7.6 g. of 4-N-cyclohexyl-benzyl bromide dissolved in 15 ml. of acetone. Thereafter the solvent is distilled off in vacuo at a low temperature, and the separated-out microcrystalline N-(4-cyclohexyl-benzyl)-6-methoxy-3α-benzoyl-tropinium bromide is washed with ether. The yield is nearly identical with the theoretical one. Melting point: between 115 and 130° C. with decomposition; in the meantime the substance undergoes decomposition.

Example 40

6.28 g. of 3α-(2-thenoyl)-tropine, which melt at 58° C. after recrystallization from petrol, are dissolved in 15 ml. of acetone and quaternized in the usual way with 6.3 g. of 4-cyclohexyl-benzyl-bromide dissolved in 15 ml. of acetone. The separated-out N-(4-cyclohexyl-benzyl)-3α-(2-thenoyl)-tropinium bromide is recrystallized from a mixture of alcohol and ether. Melting point: 212–213° C., with decomposition.

Example 41

1-methyl-tropine hydrochloride melting at 298–302° C. with decomposition is acylated at 150° C. with an excess amount of benzoyl chloride, and 7.77 g. of the thus-obtained 1-methyl-3α-benzoyl-tropine boiling at 137–139° C. at a pressure of 0.5 Hg mm. are dissolved in 20 ml. of acetone and warmed on a water-bath with 7.6 g. of 4-cyclohexyl-benzyl-bromide dissolved in 25 ml. of acetone. The quaternary compound separates out after some minutes. After warming for several hours the compound is filtered, and after washing with acetone it is dried at 60° C. The weight of the obtained N-(4-cyclohexyl-benzyl)-3α-benzoyl-1-methyl-tropinium bromide amounts to 14.75 g. (96% yield). After recrystallizing two times from a mixture of alcohol and ether, the compound melts at 230° C. with decomposition.

What we claim is:
1. A quaternary tropeine of the formula

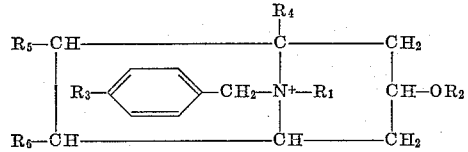

wherein $R_1$ is a member selected from the group consisting of methyl and ethyl, $R_2$ is a member selected from the group consisting of alkanoyl up to 18 carbon atoms, unsubstituted, halogen-, lower alkyl-, lower alkoxy-, phenyl-, phenoxy-, $C_3$–$C_8$ cycloalkyl- and hydroxyl-substituted acetyl, benzoyl, naphthoyl, $C_3$–$C_8$ cycloalkyl-carbonyl, tropeyl, mandelyl, amygdalyl- and thenoyl, $R_3$ is a member selected from the group consisting of unsubstituted and lower alkyl substituted $C_5$–$C_7$ cycloalkyl, $R_4$ is a member selected from the group consisting of hydrogen, methyl and ethyl, $R_5$ and $R_6$ together are selected from the group consisting of the pairs —H and —H, —H and —OH, —H and —OCH₃, —H and O.CO.CH₃, —OH and —OH, —OCH₃ and —OCH₃, O.CO.CH₃ and O.CO.CH₃, and of the member —O—; X is an anion of a pharmaceutically acceptable acid.

2. N-(4-cyclohexyl-benzyl-3α-(p-toluyl)-tropinium bromide.
3. N-(4-cyclohexyl-benzyl)-3α-benzoyl-tropinium bromide.
4. N-(4-cyclopentyl-benzyl)-3α-benzoyl-tropinium bromide.
5. $N_a$-ethyl-$N_b$-(4-cyclohexyl-benzyl)-3α-benzoyl-nortropinium bromide.
6. N-(4-cyclohexyl-benzyl)-3α-benzoyl-1-methyl-tropinium bromide.

References Cited by the Examiner

UNITED STATES PATENTS 2,962,499  11/60  Weiner et al. _____ 260—292

FOREIGN PATENTS 776,690  6/57  Great Britain.
808,926  2/59  Great Britain.

OTHER REFERENCES

Nador et al.: Chemical Abstracts, vol. 53, col. 580–581 (1959) (abstract of Arzneimittel. Forch, vol. 8 pp. 336–40, 1958).

IRVING MARCUS, *Primary Examiner*.
NICHOLAS S. RIZZO, *Examiner*.